(12) United States Patent
Cronise, IV et al.

(10) Patent No.: US 7,311,867 B1
(45) Date of Patent: Dec. 25, 2007

(54) METHOD OF RAPID MOLD DEVELOPMENT FOR SWIMMING POOLS, SPAS AND PONDS

(75) Inventors: Raymond J. Cronise, IV, Madison, AL (US); Theodore F. Baudendistal, Hampton Cove, AL (US); Richard E. Black, Jr., Fayetteville, TN (US)

(73) Assignee: The RTR Group, Inc., Fayetteville, TN (US)

( * ) Notice: Subject to any disclaimer, the term of this patent is extended or adjusted under 35 U.S.C. 154(b) by 173 days.

(21) Appl. No.: 11/128,715

(22) Filed: May 13, 2005

Related U.S. Application Data

(60) Provisional application No. 60/571,351, filed on May 14, 2004.

(51) Int. Cl.
*B29C 33/38* (2006.01)
(52) U.S. Cl. .................. 264/219; 264/255; 264/338
(58) Field of Classification Search ................. 264/219, 264/338, 255
See application file for complete search history.

(56) References Cited

U.S. PATENT DOCUMENTS

| | | |
|---|---|---|
| 2,910,759 A | 11/1959 | Lifter et al. |
| 4,015,379 A | 4/1977 | Colson, Jr. |
| 4,048,270 A * | 9/1977 | Stegmeier ..................... 264/34 |
| 4,060,946 A | 12/1977 | Lang et al. |
| 4,070,849 A * | 1/1978 | DiGiacomo .............. 52/741.12 |
| 4,074,481 A | 2/1978 | Lang et al. |
| 4,090,266 A | 5/1978 | Price |
| 4,948,296 A | 8/1990 | Salter |
| 6,637,162 B1 | 10/2003 | Holland |

* cited by examiner

*Primary Examiner*—Allan Kuhns
(74) *Attorney, Agent, or Firm*—Lanier Ford Shaver & Payne PC.; George P. Kobler

(57) ABSTRACT

A method for fabricating a pool mold comprising the steps of creating a recess, the recess having the general shape and contour of the desired finished pool and is installed with support materials and surface references. A layer of forming material is place over the support materials and surface references and formed to desired contour and grade. The forming material has substantially uniform coefficients of thermal expansion and heat transfer. The surface of the recess is sealed and coated with a release agent. A mold is then fabricated within the recess.

10 Claims, 2 Drawing Sheets

METHOD OF RAPID MOLD DEVELOPMENT FOR SWIMMING POOLS, SPAS AND PONDS

CROSS-REFERENCES TO RELATED APPLICATIONS

This application claims priority to U.S. Provisional Application No. 60/571,351 filed May 14, 2004 which is incorporated herein by reference.

BACKGROUND

1. Field

The present invention relates generally to a method of forming a mold for a fiberglass reinforced plastic (FRP) swimming pool, spa, or pond, and specifically to a method for providing a rapid process for mold development.

2. Description of the Related Art

The desire to create artificial bodies of recreational water for swimming or landscape aesthetics has been around for centuries. The general concept of building a vessel in or above ground that can be used for swimming and other water sports has been a part of nearly every recorded society. There are three basic categories of swimming pool construction methods. The oldest and largest method involves forming a concrete shell in an excavated hole. The concrete maybe be poured as a monolithic slab, sprayed onto a reinforcing steel cage using a "shotcrete" method, or can be hand packed. This concrete is in turn made water tight through a plaster or other surface coating. Alternatively, a hole can be excavated and polymer, steel, or wood walls installed along with a vinyl membrane, which lines the interior surface of the entire pool. Finally, the most recent construction method involves producing a FRP pool shell, which is transported to the excavated site by truck and placed in the hole in one pieced. It is the latter method of pool shell construction that this invention concentrates. While the process described further will concentrate on a method to produce a pool shell it is understood that this process could be expanded easily to spas, ponds, and other containment vessels.

In creating an FRP pool, spa, or pond shell one must first build a model, or plug, from which the mold is constructed. The mold is simply a mirror image of the pool. Release agents are placed on the mold and the pool or spa shell is constructed out of layers of fiberglass material and once cured, the entire shell is released from the mold. Construction of the mold is the critical and costly step in building FRP pools. Because the mold has to be structurally rigid to maintain its shape, it requires significant reinforcing substructure. As well, the original pool design has to be translated from a three dimensional computer or hand drawing into an actual mold. In many objects, such as a large boat hull, recreational vehicle decorative shell, or a car/truck body, it is fairly easy to construct a positive model, commonly referred to as a plug, so that a negative (mirror image) mold can be constructed from the plug. This allows the advantage of seeing the final part and fine tuning it before the mold is actually constructed. Once the mold is created a master plug, called a glass master, can be constructed so that many duplicate molds can be created. Like the mold, the glass master has a lot of structural reinforcement material in order to retain its precise shape. This is compounded when building extremely large parts such as what are found in swimming pool shells.

In the case of constructing a swimming pool plug, it is often difficult to build a positive part, because the actual pool is a "negative" space. In other words, it is difficult to build a model of a hole. For this reason swimming pool molds are typically fashioned in one of two methods. The first method involves building a temporary mold, which visually is an inside out swimming pool. This necessitates detailed drawings and exact measurements. It can be constructed from combinations of wood, fiberglass, plaster, auto repair putty, or the like, and once the rough shape is achieved the entire temporary mold is sprayed with a tooling gel coat and waxed. At this point, a highly reinforced pool, the glass master, is constructed. This glass master is stored for later reproduction of the mold. The disadvantages of this method are numerous. It requires many hours of sanding and filling in order to create the smooth finish of the original temporary mold. The temporary mold itself is made from a wide range of materials with different thermal expansion coefficients and different thermal conductivity coefficients, which result in an uneven cure on the glass master. This can lead to stress fractures and other imperfections due to shrinkage the glass master, especially over time. Equally important, is that one does not get a good visual view of what the pool will look like until after the glass master is constructed. This is well after most of the expense in producing the tooling has occurred. This can lead to designs that are not ideal and further work on the glass master to correct these design flaws can compound the problem of deterioration of the glass master surface and reduce the ultimate longevity of the mold.

In the second common method, various pieces of FRP pool shells can be spliced together to form a positive plug that can be viewed. This requires an inventory of steps, walls, and swim-outs, and these are then tied together with the same materials used above: wood, fiberglass, plaster, auto repair putty, or the like. Once this structure is completed it is coated with a tooling gel coat and release and a mold is built inside this plug. In this case the mold can suffer because of the non-uniform curing that occurs due to the various materials used in construction and the wide range of different thermal expansion coefficients and different thermal conductivity. These areas of higher and lower cure, and higher and lower shrinkage during cure, can result in stress fractures and warping that limit the life of the tool. The corrective action is to once again build a glass master on the mold before it is used so that the mold can be replaced when it eventually deteriorates, which results in more cost and labor. A further disadvantage is that all of the pool shells tend to look alike, because they are fashioned from many of the same subparts. Also, the lines of the pool tend to be simple, because it takes much more time, labor, and materials to create more complex geometries.

Finally, FRP pool shells produced on any mold often require detailing or minor repairs due to mold imperfections, transportation, or installation damage. During repair of these FRP pool shells it may be difficult or impossible to match the exact surface finish of the pool shell. This is typically caused by the mold sealer or wax filling in the micro porosity of the surface giving it an extremely shiny and reflective surface. While this surface characteristic is desirable on boats, cars, and other FRP products, it is not necessary on a pool, spa or pond, because the surface will be underwater. Below the surface, the water masks this surface finish. It is desirable for the surface to have a matte finish so that repairs can be easily accomplished with out going thorough a sequence of higher and higher sandpaper grits followed by buffing. In addition to the mold release masking the matte finish on the finished part, the matte finish on the mold also causes difficulty in separating the part from the mold, further complicating the production.

Various patents have been proposed to make molds for both cementitious products and fiberglass parts. Examples include U.S. Pat. Nos. 4,948,296; 2,910,759 to Lifter et al.; 4,060,946 to Lang et al.; 4,074,481 to Lang et al.; 4,090,266 to Price; 4,015,379 to Colson, Jr.; 6,637,162 B1 to Holland. However, none of these overcome the problems associated with the manufacturing of large one-piece fiberglass pool molds and none address the dramatic reduction of cost and performance benefits realized by the invention described here.

SUMMARY

The present disclosure is directed to a method to rapidly produce a pool, spa, or pond mold comprising creating a pool, spa or pond using concrete or similar material in an excavated hole or above ground, applying a synthetic polymer resin to the surface of the base structure to create a uniform, non-porous surface adding a releasing wax or parting compound to the surface to allow a mold to be released from the interior of the plug coating the interior of the sealed surface with a synthetic polymer resin, which will produce a mirrored image of the inner plug surface and backing the surface with a reinforced synthetic resin to serve to structurally reinforce the mold surface.

A primary objective is to provide a method and components to create a mold for a pool, spa or pond with uniform cure and shrinkage through the use of a plug material with an extremely even coefficient of thermal expansion and heat transfer coefficient.

A secondary objective is to provide a method and components to create a rapid prototyping process, which allows for efficient construction of a uniform pool, spa, or pond plug and allows immediate visualization of the finished product before expensive tooling is constructed.

A third objective is to provide a method and components to create subtle design irregularities in the mold to mimic traditional concrete construction techniques, which allow fiberglass shells to be used in applications where previously only concrete could be used.

A fourth objective is to provide a method and components to dramatically reduce the cost in both labor and materials of producing new pool designs—allowing for size and shape offerings to be changed whenever a design change is desired.

A fifth objective is to provide a method and components to produce a pool, spa, or pond shell on the described mold with a surface finish that is non porous and easy to maintain and repair, but is textured to provide a surface, which replicates the matte finish of cementitious shell.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
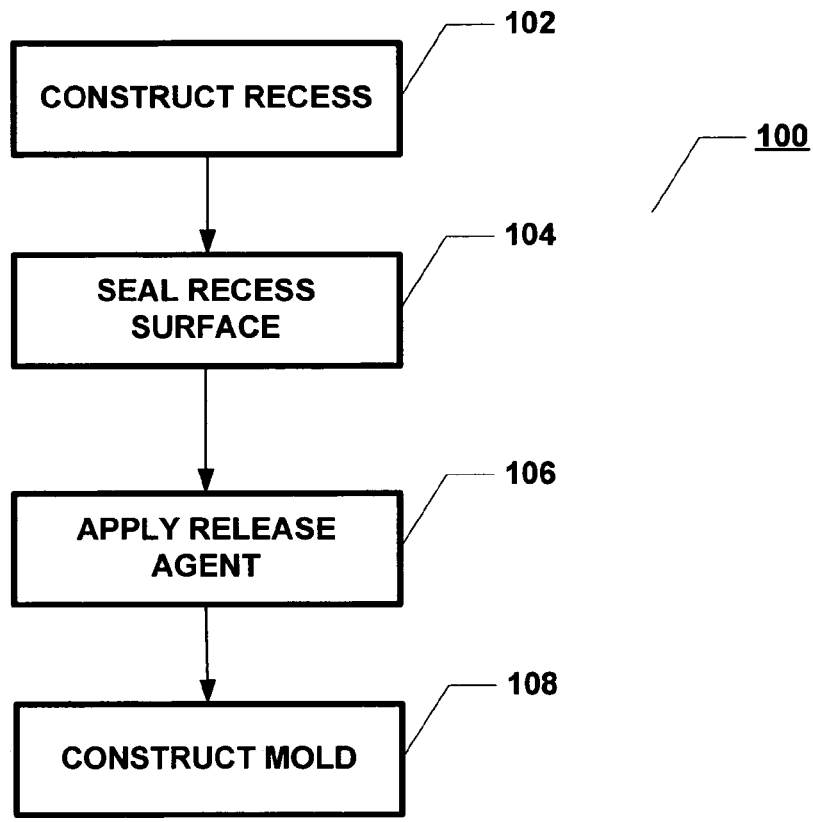
FIG. 1 is a flow chart of the inventive method disclosed herein according to an embodiment of the present invention.
Figure 2:
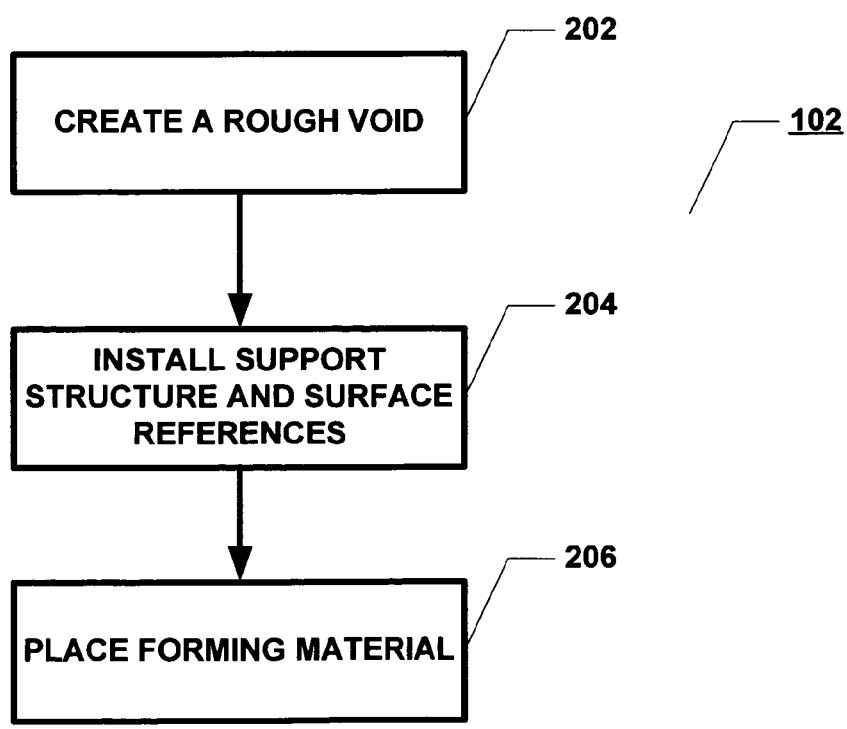
FIG. 2 is a flow chart of the process for creation of the recess according to an embodiment of the present invention.
Figure 3:
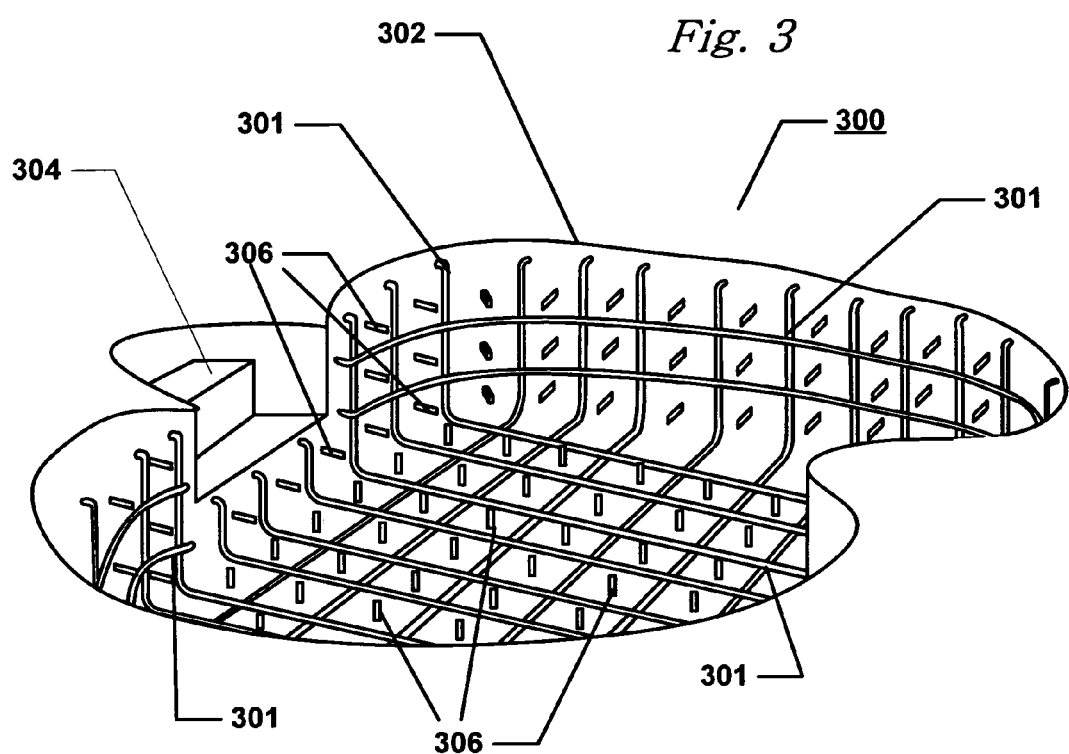
FIG. 3 is a perspective view of a recess with support structure and surface references installed according to the present invention.

The various embodiments of the present invention and their advantages are best understood by referring to FIGS. 1 through 3 of the drawings. The elements of the drawings are not necessarily to scale, emphasis instead being placed upon clearly illustrating the principles of the invention. Throughout the drawings, like numerals are used for like and corresponding parts of the various drawings.

Before explaining the disclosed embodiment of the present invention in detail it is to be understood that the invention is not limited in its application to the details of the particular arrangement shown since the invention is capable of other embodiments. The detailed description set forth below in connection with the appended drawings is intended as a description of the presently preferred embodiment of the invention, and is not intended to represent the only form in which the present invention may be implemented or utilized. The description sets forth the sequence of steps and function of constructing a pool, spa, or pond mold in connection with the illustrated embodiments. Also, the terminology used herein is for the purpose of description and not of limitation.

The inventive method will now be explained with reference to FIG. 1, a flow diagram of the process for making a mold for pools, spas, ponds and the like and to FIG. 1 a perspective view of a void excavated in accordance with one embodiment of the present method. First, a plug is constructed by forming a recess 102 (102 in FIG. 2), either by first creating a rough void in the general shape of the desired pool design by excavating a hole in the ground or by building a recess within a superstructure on top of the ground, or floor, as one would build an above-ground pool.

The bottom and walls of the recess are contoured to the rough shape of the final plug and are lined with materials to support the plug material 204. Support materials could be wire mesh, rebar, or fiber 201. Because the plug is not designed to be a permanent, load bearing structure, a significant savings can be realized as compared to a traditional concrete pool shell whereby support material and plug material usage can be minimized. A plug shell is constructed using forming material which may be concrete or "shotcrete," poured, or hand packed until the basic pool shape, swim outs, bench seats, and steps 104.

The plug may be constructed using a shotcrete method where concrete and water are sprayed onto the receiving support materials, floor, and wall to build up the plug structure. It is understood that these walls could be poured or hand packed with concrete or similar formable material, for example, synthetic foam, plaster, or rubber or other polymer system. The material out of which the plug is made should have a substantially even coefficient of thermal expansion as well as a substantially even heat transfer coefficient.

The inside dimensions of the plug floor elevations and wall plumb may be set using a series of surface reference posts 204. These reference posts 306 are used to trowel the rough slopes on the floor and correct draft on the wall in order to achieve proper sizing of the plug so that the mold will be easily released from the interior with minimal rubbing or disruption of the surface. Although it is not depicted in FIG. 3, recess areas for swim outs, bench seats and steps may also installed with support material 301 and surface reference posts 306.

Trowels may be used to create a relatively smooth surface and to work features such as floor to wall radii, steps, copings, bench seats, swim outs, or floor transitions in depth. The plug material is given a light broom finish, to enhance secondary bonding, and allowed to set to a degree where it may be walked on without disruption. A secondary material, for example mortar mix, may be used as a skin coat to smooth out any unevenness in the hardened plug material and to create a smooth and finished surface.

Once the surface has cured for several days plug surface is sealed to provide a substantially non-porous surface 104. This may be performed by applying a polymer resin primer by spray or rolling to seal the surface and promote secondary bonding of a tooling gel coat to the cementitious substrate or other material. One non-limiting example of a polymer resin is a polyester resin. Several series of spray, cure, and sanding are used to create a substantially uniform and substantially non-porous surface.

Once that is completed a tooling gel coat is applied to the interior followed by sanding with increasingly finer grit of sandpaper and buffing.

After a sufficient surface smoothness is reached, mold release agent is applied to the entire interior surface 106. Mold release agent could be a wax or parting compound that allows the mold to be released from the interior of the plug. Preferably, mild release agent is applied iteratively with alternating coats of a surface sealant. At this time, a mold is built 108, starting with application of tooling gel coat and followed by sufficient glass reinforcement and polyester resin to create the desired structural rigidity in the mold for transport and part production. Glass reinforcement may be chopped fiberglass matting, chopped fiberglass gun roving, woven fiberglass cloth or knit fabric, or a synthetic polymer fiber. Frame cribbing of wood or other suitable material may be installed to support mold shape during cure.

Once removed, the mold can be used to produce a pool shell by application of a mold release agent and followed by a surface coating and a plurality of layers of fiberglass reinforced lamination to provide structure. When the part is completed, the entire surface can be sandblasted to produce a uniform, textured matte finish. In addition, a sprayable granite finish may be used to create a natural-looking cementitious surface.

As described above and shown in the associated drawings, the present invention comprises an apparatus for a method for rapid mold development for swimming pools, spas, and ponds. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

We claim:

1. A method for fabricating a pool mold comprising the steps of:
   a. creating a recess having walls, and a bottom defined by a depth, by excavating a hole in the general shape and contour of the desired finished pool, installing support materials and surface references for defining surfaces of the walls and the bottom, and applying a layer of forming material to said walls and said bottom, said forming material having substantially uniform coefficients of thermal expansion and heat transfer, wherein said recess has substantially smooth wall and bottom surfaces;
   b. sealing said wall and bottom surfaces;
   c. applying a release agent to said sealed wall and bottom surfaces; and
   d. fabricating a mold within said recess by applying to said surfaces tooling gel and a fiberglass and resin mixture.

2. The method of fabricating a pool mold according to claim 1, wherein said forming material is one of plaster, rubber, and synthetic foam.

3. The method of fabricating a pool mold according to claim 1, wherein said step of sealing comprises applying a polymer resin to said surface.

4. The method of fabricating a pool mold according to claim 3, wherein said polymer resin is a polyester resin.

5. The method of fabricating a pool mold according to claim 1, wherein said step of creating a recess further comprises applying secondary material to said surface.

6. The method of fabricating a pool mold according to claim 5, wherein said secondary material is mortar.

7. The method of fabricating a pool mold according to claim 1, wherein said forming material is concrete.

8. The method of fabricating a pool mold according to claim 7, wherein said step of creating a recess further comprises pneumatic projection of said concrete within said recess.

9. The method of fabricating a pool mold according to claim 1, wherein said support materials are one of wire mesh, rebar and fiber.

10. The method of fabricating a pool mold according to claim 1, wherein said step of creating said recess further comprises building a superstructure within which said recess is formed.

* * * * *